(12) United States Patent
Yogev

(10) Patent No.: US 6,188,820 B1
(45) Date of Patent: Feb. 13, 2001

(54) GUIDED RADIATION RECEIVER ASSEMBLY AND A RADIATION DELIVERY WAVEGUIDE FOR USE THEREWITH

(75) Inventor: Amnon Yogev, Rehovot (IL)

(73) Assignee: Yeda Research and Development Company Israeli Company of the Weizmann Institute of Science, Rehovot (IL)

( * ) Notice: Under 35 U.S.C. 154(b), the term of this patent shall be extended for 0 days.

(21) Appl. No.: 08/817,366

(22) PCT Filed: Oct. 20, 1995

(86) PCT No.: PCT/US95/13110

§ 371 Date: Jun. 15, 1998

§ 102(e) Date: Jun. 15, 1998

(87) PCT Pub. No.: WO96/12979

PCT Pub. Date: May 2, 1996

Related U.S. Application Data

(63) Continuation-in-part of application No. 08/727,458, filed as application No. PCT/US95/04915 on Apr. 20, 1995, now Pat. No. 5,796,892.

(30) Foreign Application Priority Data

Apr. 21, 1994 (IL) .................................................... 109366

(51) Int. Cl.$^7$ ...................................................... G02B 6/20
(52) U.S. Cl. ............................ 385/43; 385/125; 385/146
(58) Field of Search ................................ 385/43, 125, 46, 385/15, 31, 39, 900

(56) References Cited

U.S. PATENT DOCUMENTS

| 3,467,098 | 9/1969 | Ayres .................................... 606/17 |
| 3,900,245 | * 8/1975 | Dyott et al. ........................ 385/125 |
| 5,005,944 | 4/1991 | Laakmann et al. ................ 385/125 |
| 5,165,773 | 11/1992 | Nath .................................... 385/125 |
| 5,412,750 | 5/1995 | Nath .................................... 385/125 |

FOREIGN PATENT DOCUMENTS 63-113406    5/1988    (JP) .

* cited by examiner

*Primary Examiner*—Hung N. Ngo
(74) *Attorney, Agent, or Firm*—Norris, McLaughlin & Marcus, P.A.

(57) ABSTRACT

A transparent radiation delivery waveguide and a guided radiation receiver assembly using the same, which assembly comprises a first transparent medium with a first refractive index $n_1$, a receiver chamber having an aperture and holding a second transparent medium having a second refractive index $n_2$, and the transparent radiation delivery waveguide having a third refractive index $n_3$ substantially equal or greater than $n_1$. The radiation delivery waveguide $n_3$ consists of a transparent vessel holding a transparent liquid medium and has a first radiation intake portion in optical contact with the first transparent medium and held tightly within the aperture of the receiver chamber, and a second, tapered radiation delivery portion of non-circular cross-sectional shape, projecting into the receiver chamber.

7 Claims, 1 Drawing Sheet

GUIDED RADIATION RECEIVER ASSEMBLY AND A RADIATION DELIVERY WAVEGUIDE FOR USE THEREWITH

This application is a Continuation-in-Part of application Ser. No. 08/727,458, filed Oct. 18, 1996, now U.S. Pat. No. 5,796,892 as a 371 of PCT/US95/04915, filed Apr. 20, 1995.

FIELD OF THE INVENTION

The invention relates to a waveguide for the transmission of guided radiation from a medium with a high refraction index to a medium with a lower refraction index. The waveguide according to the invention is in particular suitable for the delivery of concentrated sunlight into a solar receiver, but may also be used in radio telescopes, fiber optics waveguides and the like.

BACKGROUND OF THE INVENTION

A radiation delivery waveguide of the kind to which the present invention refers is, inter alia, described in PCT/US95/04915, the entire disclosure of which is incorporated herein by reference.

The radiation delivery waveguide described in PCT/US95/04915 is used in a guided radiation receiver assembly comprising a first transparent medium with a first refraction index $n_1$ and a receiver chamber having an aperture and holding a second transparent medium having a second refraction index $n_2$. The waveguide is transparent and has a third refraction index $n_3$ substantially equal to or greater than $n_1$. The transparent radiation delivery waveguide has a first, radiation intake portion in optical contact with the first transparent medium and held tightly within the aperture, and a second tapered radiation delivery portion of non-circular cross-sectional shape, projecting into the receiver chamber.

Due to the specific design of the above radiation delivery waveguide, total and Fresnel reflections of the transmitted radiation at the waveguide/second transparent medium boundary inside the receiver chamber are minimized and extraction of the delivered radiation is maximized.

The radiation delivery waveguide described above is particularly advantageous for use in the field of solar energy transfer, specifically for transferring concentrated radiation from optical concentration systems to a solar receiver. In this case, the radiation delivery waveguide as well as the concentrator constituting the first transparent medium, is made of a solid transparent medium, particularly of fused silica. However, calculations show that with large scale solar energy systems and, consequently, large scale receivers, the radiation delivery waveguide will have such dimensions that if made of solid transparent material it will be extremely heavy and expensive.

It is accordingly the object of the present invention to provide an improved, less expensive radiation delivery waveguide, and a radiation delivery assembly using such a waveguide.

SUMMARY OF THE INVENTION

In accordance with the invention there is provided a guided radiation receiver assembly comprising a first transparent medium with a first refraction index $n_1$, a receiver chamber having an aperture and holding a second transparent medium having a second refraction index $n_2$, and a transparent radiation delivery waveguide having a third refraction index $n_3$ substantially equal to or greater than $n_1$, which transparent radiation delivery waveguide has a first, radiation intake portion in optical contact with said first transparent medium and held tightly within said aperture, and a second, tapered radiation delivery portion of non-circular cross-sectional shape, projecting into the receiver chamber, wherein said radiation delivery waveguide consists of a transparent vessel holding a transparent liquid medium.

In accordance with the present invention, for the purposes of light extraction, the refraction index $n_3$ is that of the vessel.

The invention further provides a radiation delivery waveguide having a tapered radiation delivery portion of non-circular cross-sectional shape comprising a transparent housing holding a transparent liquid medium.

By one embodiment, the first transparent medium is a solar light concentrator made integral with said waveguide. In such an embodiment the radiation delivery waveguide and concentrator preferably form together a single vessel holding a single body of transparent liquid medium.

If desired, the radiation delivery waveguide may be linked to a heat exchanger for heat withdrawal from the transparent liquid medium therein.

The vessel of the radiation delivery waveguide according to the invention may be of any suitable radiation-resistant material, e.g. fused silica. Due to the relatively small width of the vessel walls and the relatively low density and price of the transparent liquid medium as compared to fused silica or similar materials, the radiation delivery guide in accordance with the present invention is of a relatively low weight and inexpensive.

Furthermore, in accordance with the invention the radiation delivery portion of the waveguide may hold additional elements made of transparent material having an index of refraction different from that of the liquid so as to interfere with a generally circular manner of radiation propagation inside the radiation delivery waveguide and thereby allow for a more effective light extraction into the receiver. Such elements may be in the form of transparent solid rods or cylindrical hollow components, either empty or filled with liquid.

BRIEF DESCRIPTION OF THE DRAWINGS

For better understanding the invention will now be described, by way of example only, with reference to the annexed drawing which shows a cross-sectional view of a radiation receiving assembly according to the invention.

DESCRIPTION OF THE PREFERRED EMBODIMENTS

Figure 1:
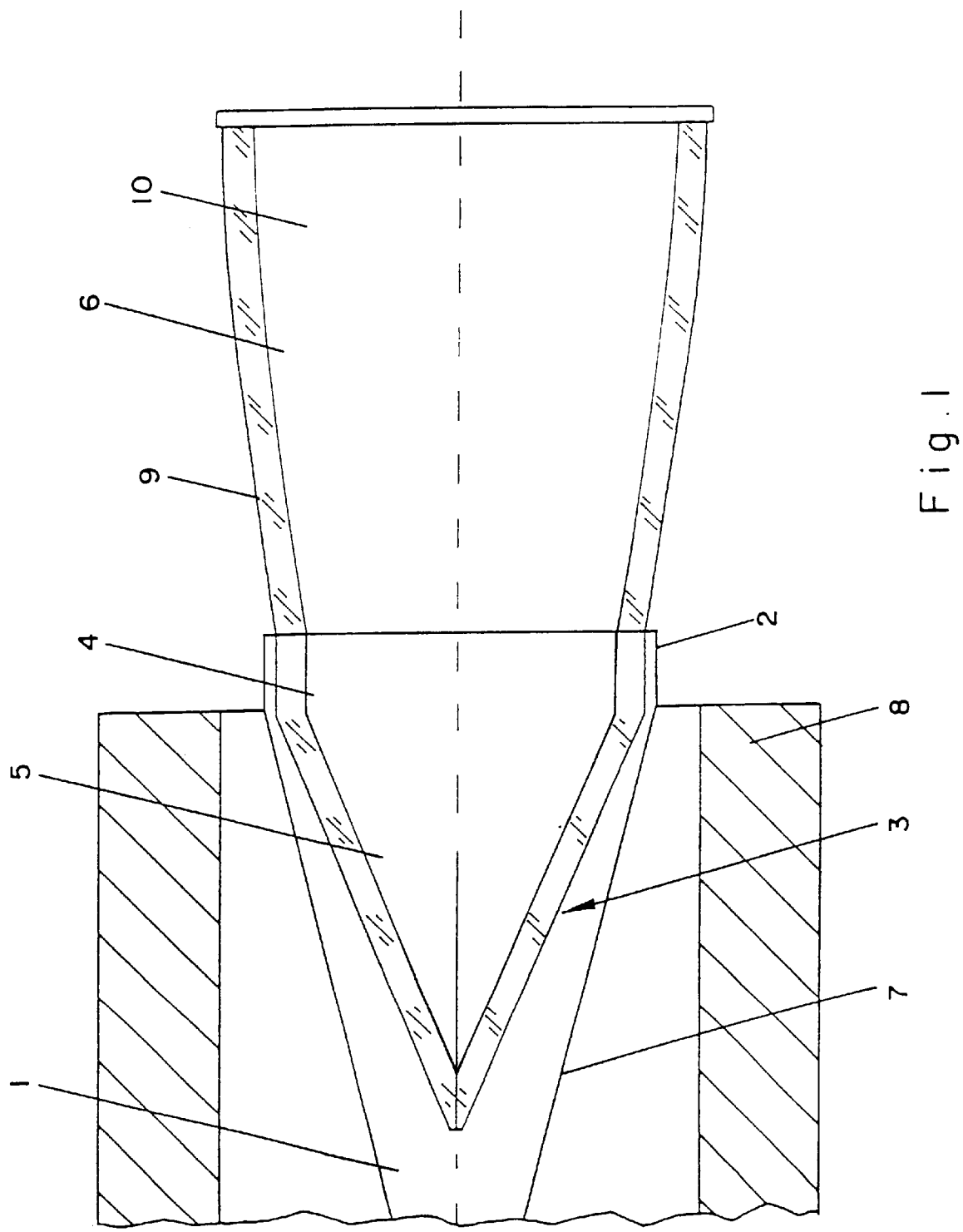

An assembly for receiving a concentrated radiation, shown in the drawing comprises a receiver chamber 1 with a circular aperture 2 holding a transparent radiation delivery waveguide 3 having a first, cylindrical intake section 4 and a second, tapered radiation delivery section 5 of a non-circular cross-sectional shape. Intake section 4 fits snugly into aperture 2 and is integral with a tubular concentrator 6. The walls 7 of receiver chamber 1 are transparent and they are surrounded by a solar absorber body 8.

It should be noted that the shape of the radiation delivery waveguide according to the present invention, the construction of the radiation receiver assembly, the mechanism of radiation delivery to the waveguide and radiation extraction from the latter to the receiver chamber, are essentially the same as described in PCT/US95/04915.

In accordance with the present invention, the radiation delivery waveguide 3 and concentrator 6 are in the form of a single transparent vessel 9 holding a single body of transparent liquid medium 10. The vessel 9 is made of solid material, e.g. quartz which is stable to long light exposure. The vessel of the radiation delivery waveguide according to the invention may be of any other suitable radiation-resistant material. Due to the relatively small width of the vessel walls and the relatively low density and price of the transparent liquid medium as compared to fused silica or similar materials, the radiation delivery waveguide in accordance with the present invention is of a relatively low weight and inexpensive.

The liquid medium 10 may, for example, be an organic fluid having a refraction index of 1.33 to 1.6, such as a fluorinated saturated hydrocarbon. Saturated fluorinated hydrocarbons are transparent in the near UV spectral range and enable elimination of vibrational and overtone absorption in the visible and IR spectral ranges, as a result of replacement of C—H bonds by C—F bonds. Alternatively, the liquid medium may be a molten inorganic salt. If desired, the liquid medium of the delivery waveguide and concentrator may be replaced from time to time.

The radiation delivery portion of the waveguide, according to the present invention, may hold additional elements made of transparent material having an index of refraction different from that of the liquid so as to interfere with a generally circular manner of radiation propagation inside the radiation delivery waveguide and thereby allow for a more effective light extraction into the receiver. Such elements may be in the form of transparent solid rods or cylindrical hollow components, either empty or filled with liquid.

In a particular embodiment of the invention the radiation receiver assembly is part of a solar energy plant and the receiver chamber either holds directly an energy conversion device such as a solar radiation absorber, a light/electricity transducer, a chemical reactor and the like; or else is made of transparent walls with any such energy conversion devices on the outside. However, it should be noted that the present invention may be used quite generally in cases where it is required to extract radiation from a transparent element made of a material with a high refraction index, into a transparent element having a lower index of refraction, and where the controllable, particularly high, power density is required.

What is claimed is:

1. A guided radiation receiver assembly comprising a first transparent medium with a first refraction index $n_1$, a receiver chamber having an aperture and holding a second transparent medium having a second refraction index $n_2$, and a transparent radiation delivery waveguide having a third refraction index $n_3$ substantially equal to or greater than $n_1$, which transparent radiation delivery waveguide has a first, radiation intake portion in optical contact with said first transparent medium and held tightly within said aperture, and a second, tapered radiation delivery portion of non-circular cross-sectional shape, projecting into the receiver chamber, wherein said radiation delivery waveguide consists of a transparent vessel holding a transparent liquid medium.

2. A guided radiation receiver assembly according to claim 1, wherein said radiation delivery waveguide is linked to a heat exchanger for the withdrawal of heat from the liquid medium therein.

3. A radiation delivery waveguide having a tapered radiation delivery portion of a non-circular cross-sectional shape comprising a transparent housing holding a transparent liquid medium.

4. A radiation delivery waveguide according to claim 3, made integral with a radiation concentrator.

5. A radiation delivery waveguide according to claim 4, comprising a single vessel with radiation delivery and concentrator sections holding a single body of transparent liquid medium.

6. A radiation delivery waveguide according to claim 5, wherein the vessel holds additional elements of transparent material having an index of refraction different from that of the liquid.

7. A radiation waveguide according to claim 3, adapted for being linked to a heat exchanger for heat withdrawal from the liquid medium therein.

* * * * *